(12) United States Patent
Buscicchio et al.

(10) Patent No.: US 11,491,427 B2
(45) Date of Patent: Nov. 8, 2022

(54) ADAPTOR PLUG FOR A SPIN-ON FILTER

(71) Applicant: Dana Motion Systems Italia S.R.L., Reggio Emilia (IT)

(72) Inventors: Luca Buscicchio, Modena (IT); Piergiorgio Trinchieri, Reggio Emilia (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 9 days.

(21) Appl. No.: 16/940,123

(22) Filed: Jul. 27, 2020

(65) Prior Publication Data
US 2021/0031127 A1 Feb. 4, 2021

(30) Foreign Application Priority Data

Jul. 30, 2019 (EP) .................................... 19189102

(51) Int. Cl.
*B01D 35/30* (2006.01)
*B01D 29/31* (2006.01)
*F15B 21/041* (2019.01)

(52) U.S. Cl.
CPC ........... *B01D 35/306* (2013.01); *B01D 29/31* (2013.01); *F15B 21/041* (2013.01); *B01D 2201/347* (2013.01); *B01D 2201/4092* (2013.01)

(58) Field of Classification Search
CPC .................. B01D 35/306; B01D 29/31; B01D 2201/347; B01D 2201/4092; B01D 35/143; B01D 27/08; F15B 21/041; F01M 2011/031; F01M 11/03; F16L 15/00
See application file for complete search history.

(56) References Cited

U.S. PATENT DOCUMENTS

| 4,433,656 A | 2/1984 | Norwood, Sr. |
| 5,139,658 A | 8/1992 | Hodge |
| 7,179,390 B1 | 2/2007 | Layton |
| 7,926,515 B2 | 4/2011 | Jung et al. |
| 2002/0125188 A1 | 9/2002 | Hacker et al. |

(Continued)

FOREIGN PATENT DOCUMENTS

WO 8803047 A1 5/1988

OTHER PUBLICATIONS

European Patent Office, Extended European Search Report Issued in Application No. 19189102.7, dated Feb. 7, 2020, Germany, 6 pages.

*Primary Examiner* — Waqaas Ali
(74) *Attorney, Agent, or Firm* — McCoy Russell LLP (57) ABSTRACT

An adaptor plug for a spin-on fluid filter, in particular for a spin-on return filter, wherein the adaptor plug comprises a plug-in end which is designed to be plugged into a cavity in a flange of a hydraulic device in a fluid tight manner and a filter end which is designed to be connected to the spin-on filter in a fluid tight, detachable manner and at least one internal fluid channel connecting said plug-in end with said filter end, wherein the adaptor plug at its filter end comprises a threaded tube or bolt on which the spin-on filter can be screwed. By this design, the use of a filter set with or without an adaptor ring between the adaptor plug and the filter is enabled. By the adaptor plug, the spin-on filter can be applied to a variety of hydraulic devices, among others, with a ¾ 16 UNF cavity.

20 Claims, 6 Drawing Sheets

(56) References Cited

U.S. PATENT DOCUMENTS

| | | | |
|---|---|---|---|
| 2006/0131225 A1* | 6/2006 | Luka | B01D 27/103 |
| | | | 210/450 |
| 2007/0261737 A1 | 11/2007 | Jung et al. | |
| 2012/0121439 A1 | 5/2012 | Sebion et al. | |
| 2014/0265303 A1* | 9/2014 | Ismert | F16L 37/113 |
| | | | 285/12 |
| 2015/0353340 A1* | 12/2015 | Gammon | B64F 1/28 |
| | | | 141/1 |

* cited by examiner

ADAPTOR PLUG FOR A SPIN-ON FILTER

CROSS-REFERENCE TO RELATED APPLICATION

The present application claims priority to European Patent Application No. 19189102.7, entitled "ADAPTOR PLUG FOR A SPIN-ON FILTER", and filed on Jul. 30, 2019. The entire contents of the above-listed application is hereby incorporated by reference for all purposes.

TECHNICAL FIELD

The present document generally relates to an adaptor plug for a spin-on filter, to an adaptor plug set including said adaptor plug and a ring adaptor, and to a spin-on filter set including a spin-on filter and said adaptor plug. Such devices are generally applicable in the field of mechanical engineering, in particular in the field of hydraulics.

BACKGROUND AND SUMMARY

Usually, hydraulic devices are designed to work and function reliably even in difficult environments and under difficult circumstances. On the other hand, in order to make sure that the function of such a hydraulic device is not disturbed by contaminated hydraulic fluid, hydraulic circuits usually comprise mechanical filters for cleaning the hydraulic fluid. Such kinds of mechanical filters are known, for example, from motor systems of vehicles. Filters are often designed as spin-on filters which can be connected to a flange of a hydraulic device, for example by means of a thread. Spin-on filters usually work efficiently and require only very little space. In addition, they are easy to replace or to remove in order to clean them.

A filter mount for a fluid filter is known, for example, from the prior art U.S. Pat. No. 5,139,658. U.S. Pat. No. 5,139,658 discloses a hydraulic power unit having a hydraulic fluid reservoir with a top closure mount and a spin-on filter that can be positioned on the top closure mount.

US 20120121439 discloses a hydraulic power module with a filter housing that is integrated in the hydraulic reservoir.

U.S. Pat. No. 7,179,390 discloses a remote filtering station connectable to a mechanical device, which is part of a car, through conduits. U.S. Pat. No. 7,179,390 also discloses a filter replacement adaptor that enables connection of a filter with the conduits.

U.S. Pat. No. 7,926,515 discloses a modular hydraulic unit with a filter connected to a connection module. The connection module has a mounting opening for housing the filter unit.

Taking into account this existing prior art, there is demand for an easy and comfortable way of connecting a spin-on fluid filter with different hydraulic devices.

This object is solved by an adaptor plug according to the described embodiments, and by an adaptor plug set and by a spin-on filter set including said adaptor plug according to various embodiments described.

In one implementation, the embodiments described comprise an adaptor plug for a spin-on fluid filter, in particular for a spin-on return filter, wherein the adaptor plug comprises a plug-in end which is designed to be plugged into a cavity in a flange of a hydraulic device in a fluid tight manner and a filter end which is designed to be connected to the spin-on filter in a fluid tight, detachable manner and at least one internal fluid channel connecting said plug-in end with said filter end, wherein the adaptor plug at its filter end comprises a threaded tube or bolt on which the spin-on filter can be screwed.

The hydraulic device can, for example, be formed by a hydraulic manifold and in particular by a hydraulic power pack. Such kind of a hydraulic device typically has chambers and channels which may contain a hydraulic fluid. A flange of the hydraulic device can provide a channel and/or an opening that connects the internal chambers and channels of the hydraulic device with the outside. A spin-on filter may be connected in a fluid tight manner with the flange of the hydraulic device. Often, such a flange is provided with a standard cavity ¾-16 UNF. In order to be able to use spin-on filters for different hydraulic devices irrespective of the position of the flange and irrespective of the space provided for such a filter, the presently proposed adaptor plug allows connecting the flange of the hydraulic device with said filter. For this purpose, the adaptor plug may be threaded into the ¾ 16 UNF thread of a cavity of a flange.

The adaptor plug inside the hydraulic device can be connected with the chambers or channels of the hydraulic device in a fluid tight manner by one or more seals, for example, elastomer seals. In this way, the plug-in end of the adaptor plug may be connected to the hydraulic device. The filter end of the adaptor plug may be designed to be connected to the spin-on filter in a fluid tight, detachable manner. For this purpose, the adaptor plug can comprise a tube or a hollow bolt. The tube or bolt may have a thread on its outside or on its outer surface so that the filter may be threaded onto the tube or bolt.

In order to fix the adaptor plug to the hydraulic device, the adaptor plug may be threaded into the thread of the flange with the help of an Allan wrench hex key, wherein the hexagon may be inside the thread on which the filter is screwed or may be screwed.

When the filter is screwed onto the thread of the adapter plug, the oil in the hydraulic circuit may enter the filter through a first internal fluid channel of the adaptor plug. In case the spin-on filter is a return filter, the hydraulic fluid may leave the filter by a second internal fluid channel of the adapter plug and return to the hydraulic device. One implementation of the embodiments described may therefore provide that the threaded tube or bolt comprises at least a first internal fluid channel of the adaptor plug, wherein the first internal fluid channel ends at the free end of the threaded tube or bolt.

The first internal fluid channel may extend from the plug-in end of the adaptor plug to the filter end. When the adapter plug is in use, the openings of the first internal fluid channel at both ends of the adaptor plug may be located inside a hydraulic space which is sealed from the outside by one of the seals between the filter and the adaptor plug or by one of the seals between the adaptor plug and the hydraulic device. In one implementation the first internal fluid channel may extend at least partially in an axial direction wherein the axial direction is defined as parallel to the direction in which the adaptor plug is plugged into the hydraulic device and/or the direction in which the filter is screwed on a thread of the adaptor plug.

The adapter plug may comprise a filter flange from which the threaded tube or bolt extends. The filter flange may then have a larger diameter than the threaded tube or bolt. And the filter flange may further provide a ring-shaped sealing area surrounding the threaded tube or bolt.

The adapter plug may further comprise at least a second internal fluid channel, wherein the second internal fluid channel extends from the circumference of the threaded tube or bolt through the adaptor plug to its plug-in end.

The second internal fluid channel generally extends through the adaptor plug in a direction that is parallel to the general direction of the first internal fluid channel. The first and second internal fluid channels usually have no connection with each other and are strictly separated. One of the first and second internal fluid channels may serve to lead the hydraulic fluid from the hydraulic device to the filter whereas the other internal fluid channel may serve to lead the hydraulic fluid from the filter back to the hydraulic device. A more detailed description of the geometry of the internal fluid channels is given below with reference to the drawings.

The plug-in end of the adaptor plug may be cylindrical and may comprise an external thread and at least one circumferential or ring shaped sealing.

Generally, cylindrical plugs are easy to manufacture and, in addition, it is easy to provide an efficient hydraulic sealing between a hydraulic plug and socket.

The embodiments herein not only refer to an adaptor plug as described above but also to an adaptor plug set for a spin-on fluid filter comprising an adaptor plug as described above and further comprising a ring adaptor which can be slipped on the threaded tube or bolt from the filter end of the adaptor plug and which, in its axial extension, is usually smaller than the length of the threaded tube or bolt so that the threaded tube or bolt extends in an axial direction of the ring adaptor through and beyond the ring adaptor.

The ring adaptor may or may not have an internal thread that can be screwed on the threaded outer circumference of the tube or bolt of the adaptor plug. If in one possible implementation the ring adaptor has no internal thread, it can simply be slipped on to the tube or bolt, such as with a flexible angular position. If the ring adaptor is placed between the adaptor plug and the fluid filter and sealed in a fluid tight manner, the internal opening of the ring adaptor is connected to one of the first or second internal fluid channels. The opening of the ring adaptor is further connected to a radial measurement channel or sensor channel which extends through the ring adaptor in the radial direction. The measurement channel provides for an opportunity to connect a sensor to the hydraulic chamber inside the ring adaptor in a fluid tight manner.

This way, the adaptor plug set allows for using the adaptor plug and the filter with or without a ring adaptor depending on the fact if a sensor shall be used or not. For this purpose, the tube or bolt of the adaptor plug and the thread on its outside has to be long enough to allow for screwing or slipping the spin-on filter onto the tube or bolt irrespective of whether a ring adaptor is mounted or not. The possibility to apply a sensor on the ring adaptor, as described above, may be implemented by providing that the ring adaptor comprises a radial sensor channel extending from the inner circumference to the outer circumference of the ring adaptor, wherein a sensor, in particular a pressure sensor or a pressure transducer, is or can be attached to the sensor fluid channel in a fluid tight manner.

The embodiments herein not only refer to an adaptor plug and an adaptor plug set as described above but also to a spin-on filter set for a fluid filter comprising a spin on fluid filter and an adaptor plug, wherein the spin-on filter comprises a threaded hole wherein the thread of the threaded hole can be screwed on the threaded tube or bolt and wherein the threaded hole in its axial extension is at least as long as the threaded tube or bolt.

This design allows screwing the fluid filter fully onto the tube or bolt of the adaptor plug in such a way that one end of the filter may be sealed against a filter flange of the adaptor plug. This fluid tight sealing may be provided by way of an elastomer seal which may be positioned between the filter and the filter flange.

At the same time, an implementation of the spin-on filter set may provide that a ring adaptor is provided between the spin-on filter and the adaptor plug and a sealing is provided between the spin-on filter and the ring adaptor as well as between the ring adaptor and the adaptor plug.

For this case, the tube or bolt of the adaptor plug has to be long enough to extend through the opening of the ring adaptor and beyond it so that the fluid filter may be screwed onto the free end of the tube or bolt in such a way that the ring adaptor is pressed between the adaptor plug/filter flange on one side and the fluid filter on the other side.

The spin-on filter set is usable in cases where a ring adaptor and a respective sensor is needed as well as in cases where such a ring adaptor and sensor is not required.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The presently proposed adaptor plug, adaptor plug set and spin-on filter set will be described in detail with reference to figures of the drawings below. The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIGS. 1, 2, 5, 6, 7, and 8 are shown approximately to scale, according to some embodiments. FIGS. 3, 4, 9, and 10 are shown with components in proportional size with one another, according to some embodiments.

DETAILED DESCRIPTION

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
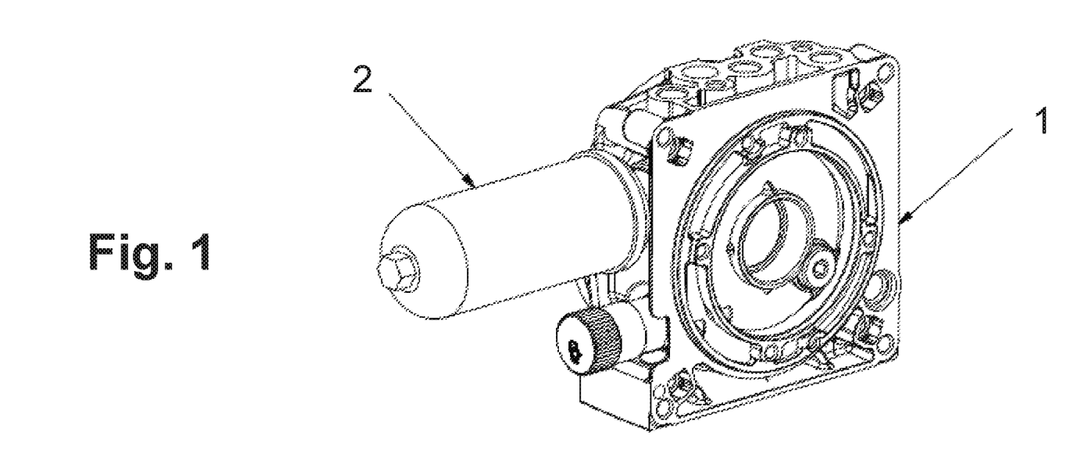
FIG. 1 shows a three-dimensional view of an exemplary hydraulic device.

FIG. 1 shows in a three-dimensional view of an exemplary hydraulic device 1 and a spin-on return filter 2 for hydraulic fluid, according to embodiments. The hydraulic device 1 may, for example, be a hydraulic power pack or part of a motor of a vehicle.

Figure 2:
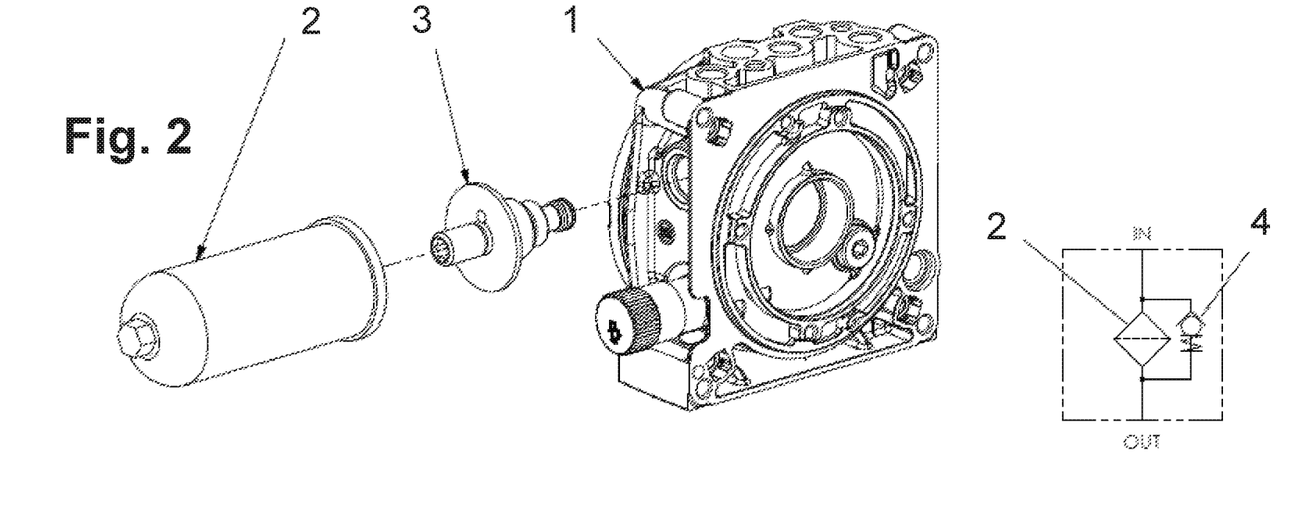
FIG. 2 shows a three-dimensional exploded view of an exemplary hydraulic device with an adaptor plug and a fluid filter, according to embodiments.

In FIG. 2, a hydraulic device 1 is shown again in a three-dimensional view wherein the spin-on filter 2 and an adaptor plug 3 are shown in an explosive view. As explained below, the adaptor plug 3 preferably has two internal fluid channels which allow for hydraulic fluid/oil entering the filter 2 and leaving filter 2 in direction of the hydraulic device 1. FIG. 2 also comprises a symbolic view of the filter and a check valve 4 which is hydraulically connected in parallel to the filter 2. The check valve 4 may be disposed inside a housing of the filter 2. The internal design of the return filter 2 is known from the prior art and may be any design of a mechanical filter which serves to clean the hydraulic fluid.

Figure 3:
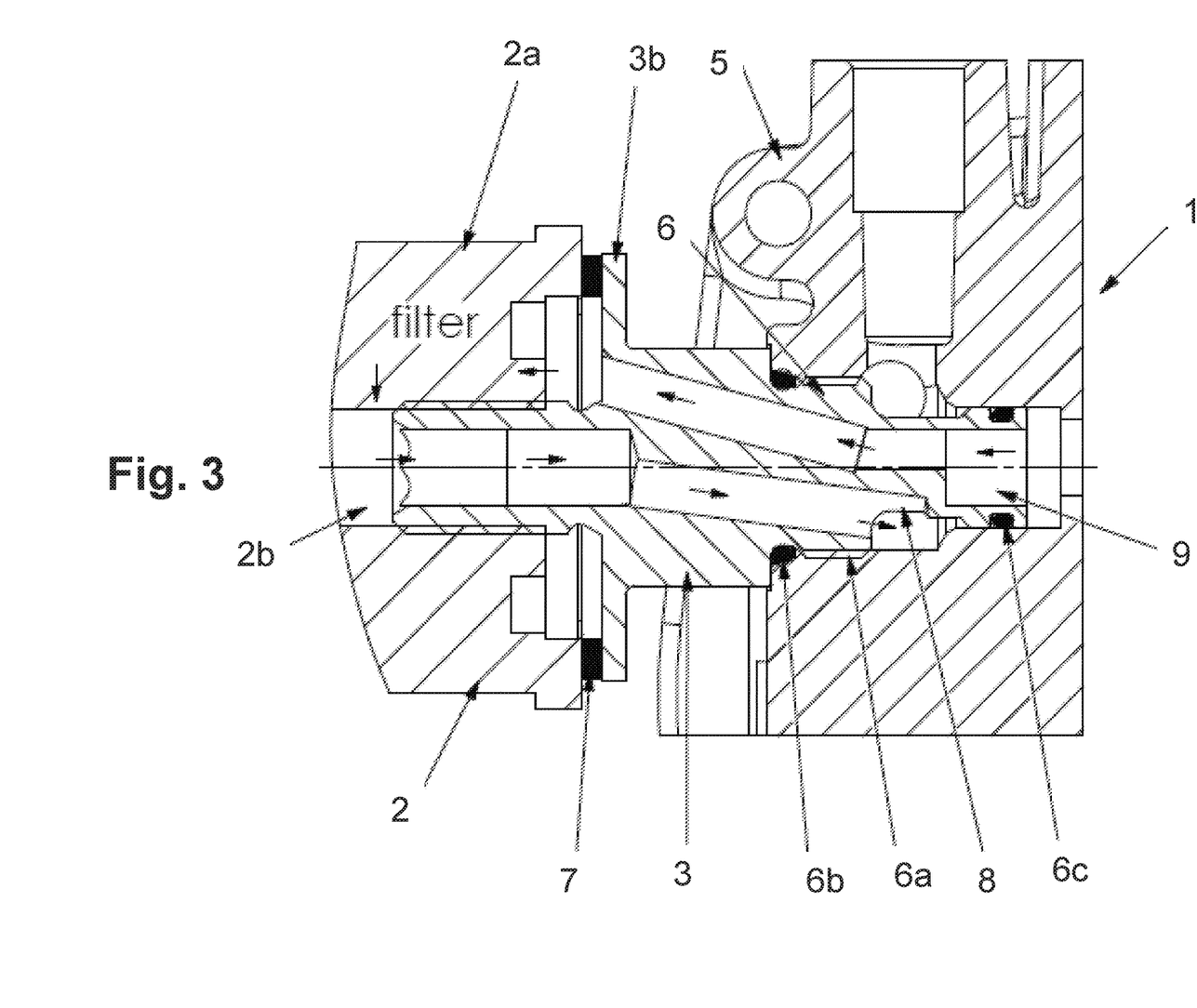
FIG. 3 shows a longitudinal cross-section of an adaptor plug with parts of a filter and a hydraulic device, according to embodiments.
Figure 4:
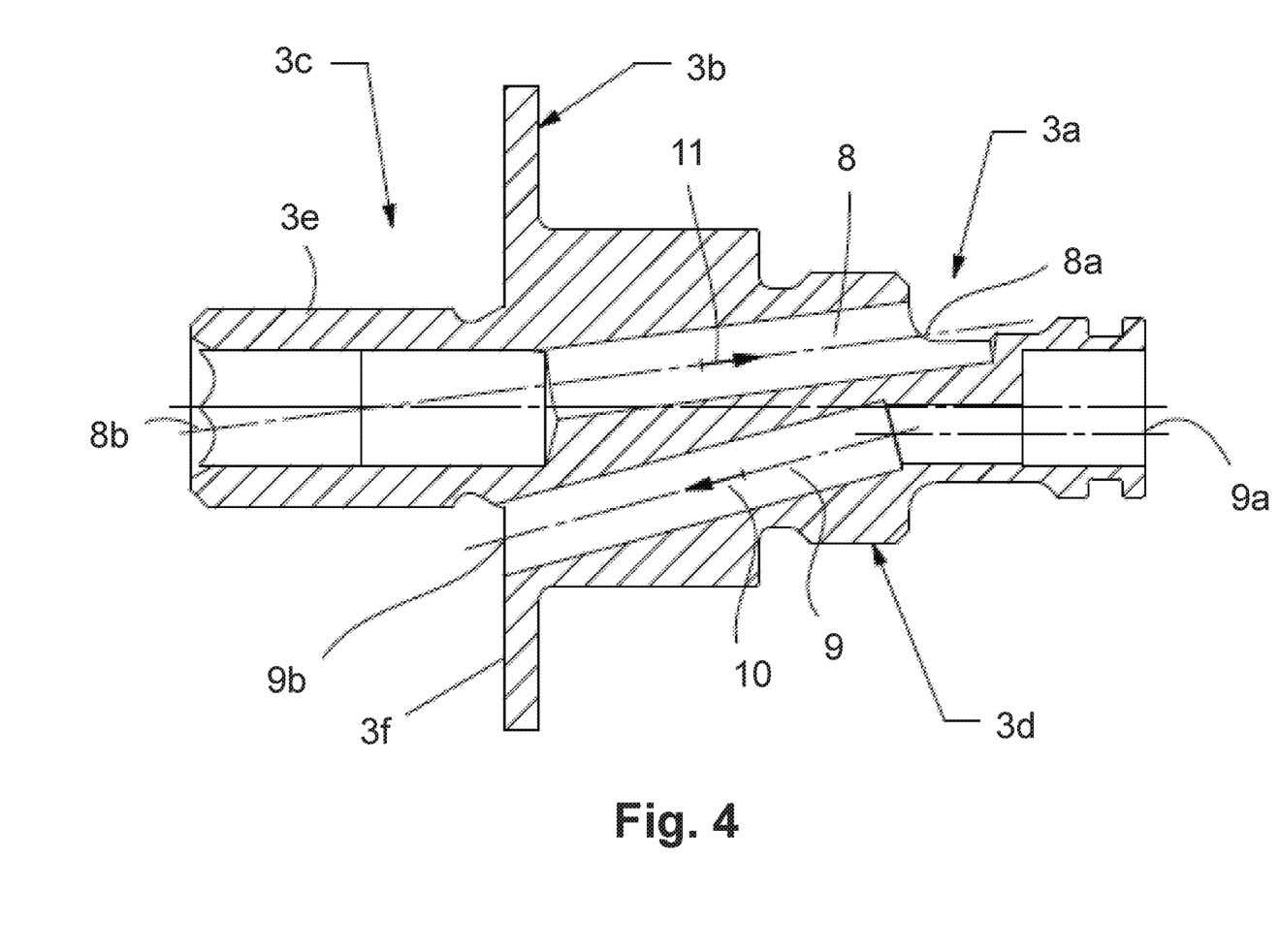
FIG. 4 shows a longitudinal cross-section of an adaptor plug, according to embodiments.

FIG. 3 shows a cross-sectional view of the adaptor plug 3, part of the filter 2, and a part of the hydraulic device 1. FIG. 4 shows a more detailed sectional view of the adaptor plug 3.

The shown part of the hydraulic device 1 comprises a flange 5 and a standard cavity ¾-16 UNF indicated as 6 to which the adapter plug 3 fits and into which it is plugged. The cavity 6 in the hydraulic device 1 comprises a thread 6a in which a respective thread 3d of the adaptor plug 3 is or may be screwed (FIG. 4). Further, two ring-shaped seals 6b, 6c are provided between the cavity 6 and the plug-in end 3a of the adaptor plug. Another seal 7 is provided as a ring-shaped seal between the filter flange 3b of the adaptor plug and a front end 2a of the filter 2. A tube 3e at the filter end 3c of the adaptor plug has an external thread and is or may be screwed into a thread in the filter 2. The filter 2, therefore, provides a bore 2b with an internal thread. The tube 3e further has an Allen wrench opening at its free end, which allows screwing the plug into the cavity 6.

In FIG. 4, 3c indicates the filter end 3c of the adaptor plug 3 comprising the filter flange 3b and the threaded tube 3e. FIG. 4 further depicts the plug-in end 3a comprising the outer thread 3d which is or may be screwed into the cavity 6 of the hydraulic device 1 and, in particular, in the thread 6a. FIG. 4 also illustrates that the filter flange 3b comprises a ring-shaped sealing area 3f for supporting the ring-shaped seal 7. The ring-shaped sealing area 3f of the filter flange 3b surrounds the tube 3e. The plug-in end 3a further comprises the part of the adaptor plug where the first internal channel 8 and the second internal channel 9 end on the plug-in end 3a. The first internal channel 8 has a first opening 8a at the plug-in end 3a on the lateral side of the adaptor plug 3 and a second opening 8b at the filter end 3c of the adaptor plug 3 at the end of the threaded tube 3e. The second opening 8b ends in the front end of the threaded tube 3e. The second internal channel 9 has a first opening 9a at the plug-in end 3a of the adaptor plug 3 that ends in the front surface of the plug-in end 3a of the adaptor plug 3. The second internal channel 9 has its second opening 9b on a lateral side of the threaded tube 3e at the filter end 3c of the adaptor plug 3. The second opening 9b is located in the filter flange 3b.

In the installed state where the adaptor plug is plugged into the cavity 6 of an hydraulic device 1 and a spin-on filter 2 is or may be screwed onto the adaptor plug 3 as shown in FIG. 3, hydraulic fluid may enter from the hydraulic device 1 into the first opening 9a of the second internal channel 9 and may enter the filter 2 at the second opening 9b of the second internal channel. When the hydraulic fluid exits the filter, it enters into the second opening 8b of the first internal channel 8 which is implemented according to FIGS. 3 and 4 as a central bore in the tube 3e. From there, the hydraulic fluid may flow through the first internal channel 8 to its first opening 8a where it may exit the adaptor plug 3 on the lateral side and may be led to a tank in the hydraulic device 1. The direction of flow of the hydraulic fluid is indicated in FIG. 4 by arrows 10, 11.

Figure 5:
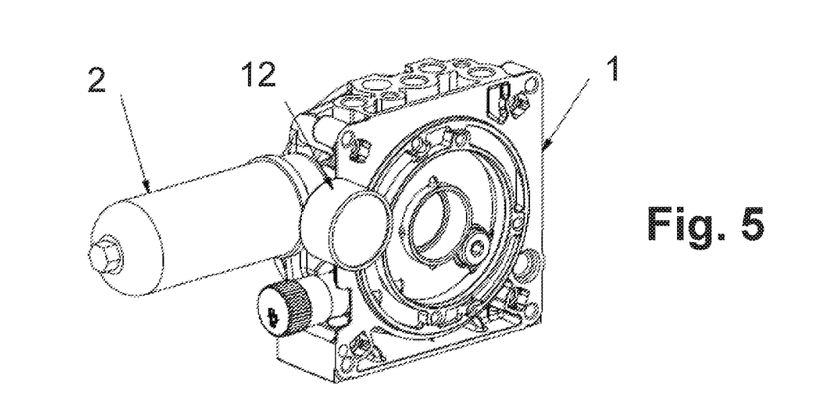
FIG. 5 shows a three-dimensional view of a hydraulic device with a filter, according to embodiments.

FIG. 5 shows in a perspective view a hydraulic device 1 with a spin-on filter 2 and a clogging indicator which is implemented as a pressure gauge 12.

Figure 6:
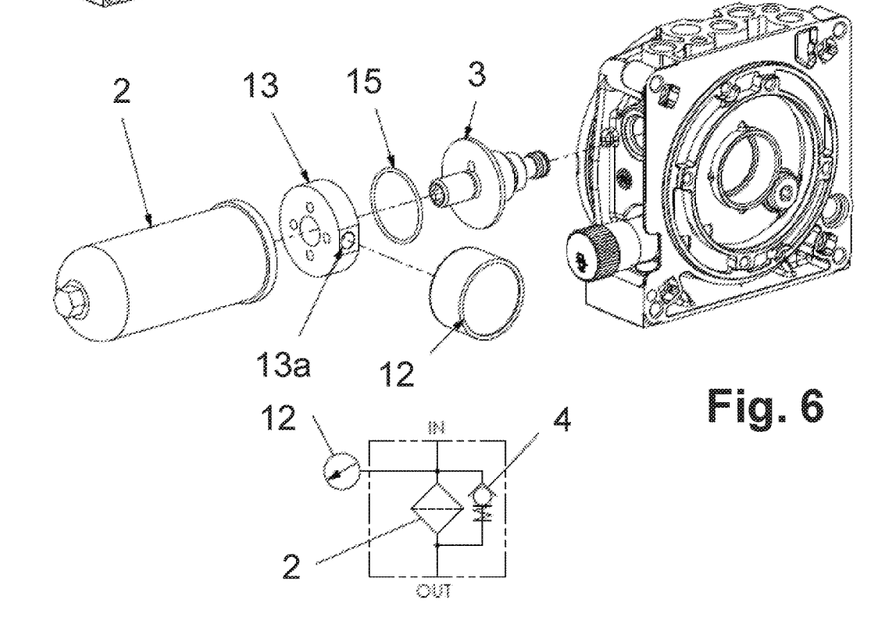
FIG. 6 shows a three-dimensional explosive view of a hydraulic device and a spin-on filter set, according to embodiments.

The explosive view of the spin-on filter set is shown in FIG. 6. In detail, FIG. 6 shows the spin-on filter 2, the adaptor plug 3, the ring adaptor 13, and a pressure gauge 12. A ring shaped seal 15 is provided both between the ring adaptor 13 and the adaptor plug 3, and between the ring adaptor 13 and the filter 2.

The symbolic scheme in FIG. 6 at the bottom shows the hydraulic circuit with a filter 2, the check valve 4, and a pressure gauge 12 which serves as a clogging indicator.

FIG. 6 further shows that the ring adaptor 13 provides a radial opening 13a in which a plug of the pressure gauge 12 can be plugged or screwed in a fluid tight manner. The radial opening 13a thereby forms a measurement channel or sensor channel.

Figure 7:
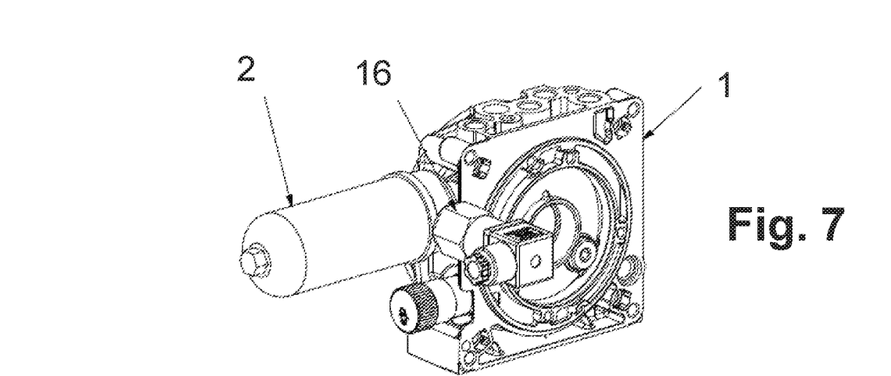
FIG. 7 shows a three-dimensional view of a hydraulic device with a second kind of a spin-on filter set, according to embodiments.

FIG. 7 shows a perspective view of a hydraulic device 1 with a spin-on filter 2 and a ring adaptor with a pressure transducer 16.

Figure 8:
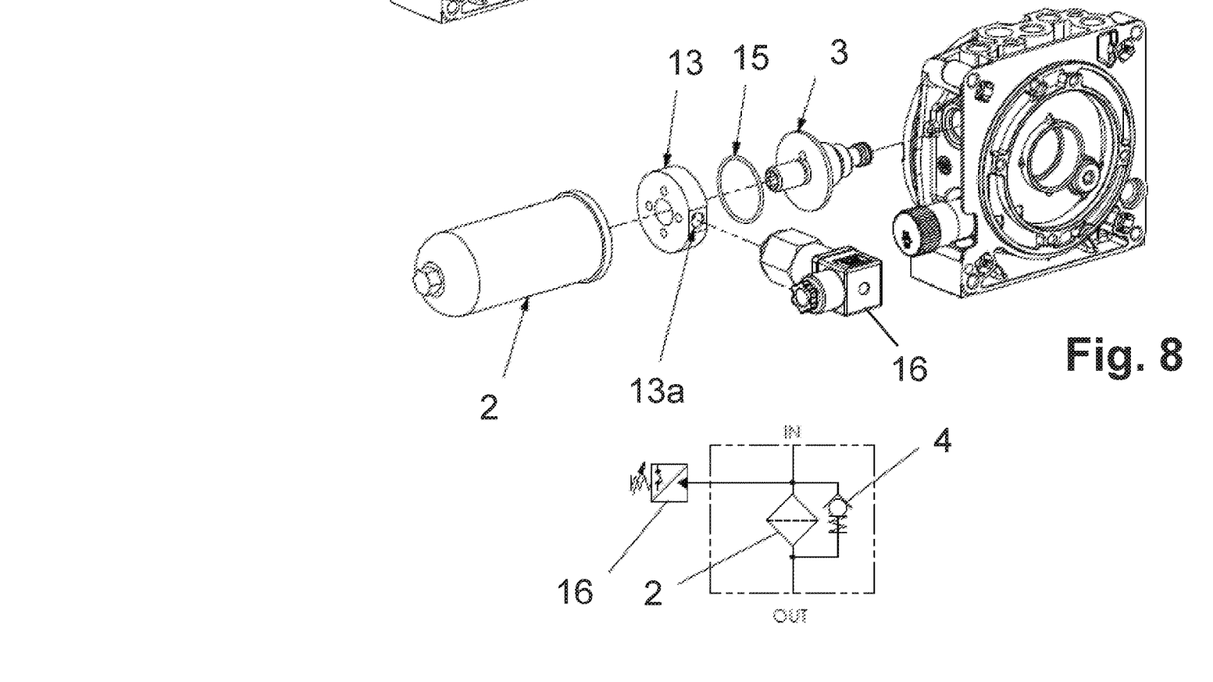
FIG. 8 shows a three-dimensional explosive view of a hydraulic device with a spin-on filter set of the second kind, according to embodiments.

FIG. 8 shows an explosive view of the spin-on filter set with the filter 2, the ring adaptor 13, a seal 15, the adaptor plug 3, and a pressure transducer 16 which can be plugged into the radial opening 13a of the ring adaptor. The hydraulic scheme in FIG. 8 at the bottom shows a combination of the filter 2, the check valve 4, and the pressure transducer 16.

Figure 9:
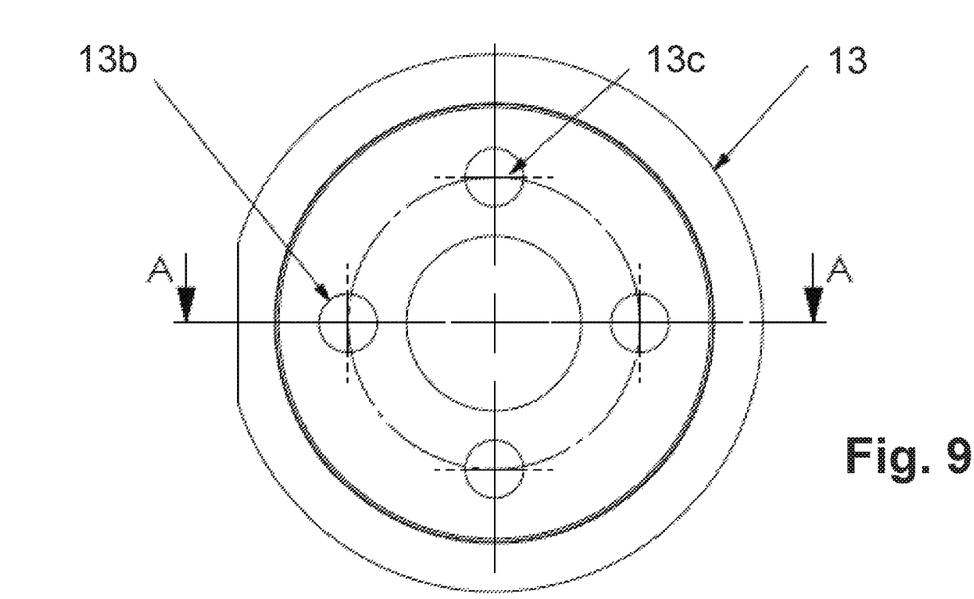
FIG. 9 shows a cross-sectional view of a ring adaptor, according to embodiments.

FIG. 9 shows in a more detailed view the ring adaptor 13 with four axial channels 13b, 13c one of which connects the internal channel 9 of the adaptor plug 3 with the radial opening 13a.

Figure 10:
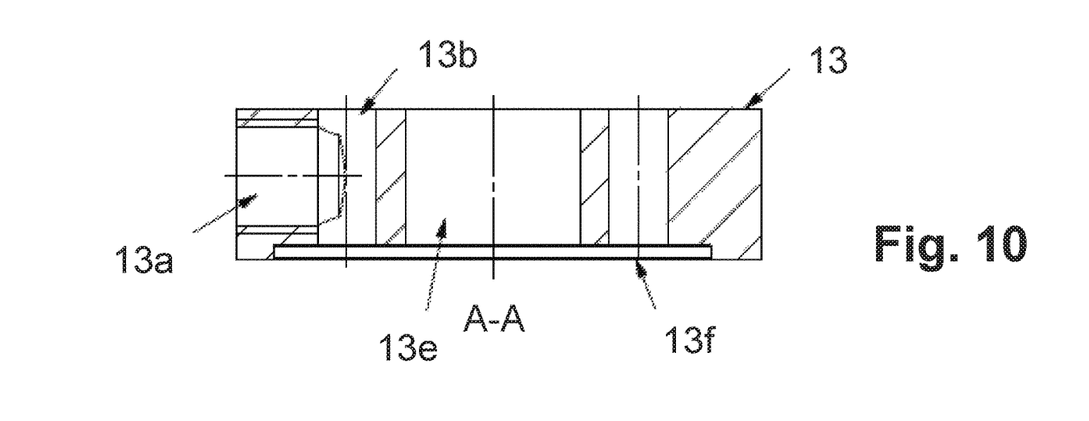
FIG. 10 shows a ring adaptor of FIG. 9 in a longitudinal cross-section, according to embodiments.

FIG. 10 shows a cross-sectional view parallel to the axial direction of the adaptor plug which shows one of the channels 13b and the central opening 13e which is shifted onto the threaded tube of the adaptor plug. A recess 13f in a front surface of the ring adaptor 13 serves to connect the channels 13b, 13c, 13e with one another. The radial channel 13a with its opening on the lateral surface of the ring adaptor 13 is connected to the internal channel 13b. This way, a pressure indicator, pressure gauge, or pressure transducer can be connected to the channels of the ring adaptor and hence to the second internal channel of the adaptor plug. This spin-on filter set as described above allows for a flexible use of a spin-on return filter 2 with or without a ring adaptor 13 and a pressure gauge or a pressure transducer. The adaptor plug 3 enables such a flexible use of the filter 2 with a variety of hydraulic devices 1, for example with a ¾ 16 UNF cavity.

FIGS. 1, 2, 3, 5, 6, 7, and 8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. An adaptor plug for a spin-on fluid filter, wherein the adaptor plug comprises:
a plug-in end configured to be plugged into a cavity in a flange of a hydraulic device in a fluid tight manner,
a filter end configured to be connected to the spin-on filter in a fluid tight, detachable manner, and
at least one internal fluid channel connecting said plug-in end with said filter end,
wherein the adaptor plug at its filter end comprises a threaded tube or bolt on which the spin-on filter can be screwed, wherein the adaptor plug has a filter flange from which the threaded tube or bolt extends, the filter flange having a planar surface extending radially outward from the threaded tube or bolt to an outer perimeter of the flange, and wherein a sealing is provided on the planar surface so as to create a fluid tight connection between the planar surface of the filter flange and an axially opposite surface of the spin-on filter when the spin-on filter is screwed onto the threaded tube or bolt.

2. The adaptor plug according to claim 1, wherein the threaded tube or bolt comprises at least a first internal fluid channel of the adaptor plug, wherein the first internal fluid channel ends at a free end of the threaded tube or bolt.

3. The adaptor plug according to claim 1, wherein the filter flange has a larger diameter than the threaded tube or bolt and wherein the filter flange provides a ring-shaped sealing area surrounding the threaded tube or bolt.

4. The adaptor plug according to claim 1, having at least a second internal fluid channel, wherein the second internal fluid channel extends from a circumference of the threaded tube or bolt through the adaptor plug to its plug-in end.

5. The adaptor plug according to claim 3, having at least a second internal fluid channel, wherein the second internal fluid channel at the filter end of the adaptor extends through the filter flange next to the threaded tube or bolt.

6. The adaptor plug according to claim 1, wherein its plug-in end is cylindrical and comprises an external thread and at least one ring shaped sealing.

7. An adaptor plug set for a spin-on fluid filter comprising an adaptor plug having a plug-in end configured to be plugged into a cavity in a flange of a hydraulic device in a fluid tight manner, a filter end configured to be connected to the spin-on filter in a fluid tight, detachable manner, and at least one internal fluid channel connecting said plug-in end with said filter end, wherein the adaptor plug at its filter end comprises a threaded tube or bolt on which the spin-on filter can be screwed, and further comprising a ring adaptor which can be slipped on the threaded tube or bolt from the filter end of the adaptor plug and which, in its axial extension is smaller than the length of the threaded tube or bolt so that the threaded tube or bolt extends in an axial direction of the ring adaptor through and beyond the ring adaptor, wherein the adaptor plug has a filter flange from which the threaded tube or bolt extends, and wherein a sealing is provided between the filter flange and the ring adaptor as well as between the ring adaptor and the adaptor plug.

8. The adaptor plug set according to claim 7, wherein the ring adaptor comprises a radial sensor channel extending from the inner circumference to the outer circumference of the ring adaptor, wherein a sensor, a pressure sensor or a pressure transducer, is or can be attached to the sensor fluid channel in a fluid tight manner.

9. A spin-on filter set for a fluid filter comprising a spin-on fluid filter and an adaptor plug, the adaptor plug having a plug-in end configured to be plugged into a cavity in a flange of a hydraulic device in a fluid tight manner, a filter end configured to be connected to the spin-on filter in a fluid tight, detachable manner, and at least one internal fluid channel connecting said plug-in end with said filter end, wherein the adaptor plug at its filter end comprises a threaded tube or bolt on which the spin-on filter can be screwed, wherein the spin-on filter comprises a threaded hole wherein the thread of the threaded hole can be screwed on the threaded tube or bolt and wherein the threaded hole in its axial extension is at least as long as the threaded tube or bolt, wherein a ring adaptor is provided between the spin-on filter and the adaptor plug, and wherein a sealing is provided between the spin-on filter and the ring adaptor as well as between the ring adaptor and the adaptor plug.

10. The spin-on filter set according to claim 1, wherein a plug-in end fluid opening and a threaded tube or bolt end fluid opening are aligned with one another along an axis of rotation about which the spin-on filter is screwed onto the threaded tube or bolt.

11. The adaptor plug set of claim 7, wherein the threaded tube or bolt comprises at least a first internal fluid channel of the adaptor plug, wherein the first internal fluid channel ends at a free end of the threaded tube or bolt.

12. The adaptor plug set of claim 7, wherein the filter flange has a larger diameter than the threaded tube or bolt and wherein the filter flange provides a ring-shaped sealing area surrounding the threaded tube or bolt.

13. The adaptor plug set of claim 7, having at least a second internal fluid channel, wherein the second internal fluid channel extends from a circumference of the threaded tube or bolt through the adaptor plug to its plug-in end.

14. The adaptor plug set of claim 12, having at least a second internal fluid channel, wherein the second internal fluid channel at the filter end of the adaptor extends through the filter flange next to the threaded tube or bolt.

15. The adaptor plug set of claim 7, wherein its plug-in end is cylindrical and comprises an external thread and at least one ring shaped sealing.

16. The spin-on filter set of claim 9, wherein the threaded tube or bolt comprises at least a first internal fluid channel of the adaptor plug, wherein the first internal fluid channel ends at a free end of the threaded tube or bolt.

17. The spin-on filter set of claim 9, having a filter flange from which the threaded tube or bolt extends, wherein the filter flange has a larger diameter than the threaded tube or bolt and wherein the filter flange provides a ring-shaped sealing area surrounding the threaded tube or bolt.

18. The spin-on filter set of claim 9, having at least a second internal fluid channel, wherein the second internal fluid channel extends from a circumference of the threaded tube or bolt through the adaptor plug to its plug-in end.

19. The spin-on filter set of claim 17, having at least a second internal fluid channel, wherein the second internal fluid channel at the filter end of the adaptor extends through the filter flange next to the threaded tube or bolt.

20. The spin-on filter set of claim 9, wherein its plug-in end is cylindrical and comprises an external thread and at least one ring shaped sealing.

\* \* \* \* \*